(No Model.) 5 Sheets—Sheet 1.
J. H. SIMPSON, W. G. GLADHILL & C. GAILLIOT.
LINK BENDING MACHINE.

No. 318,517. Patented May 26, 1885.

(No Model.) 5 Sheets—Sheet 2.
J. H. SIMPSON, W. G. GLADHILL & C. GAILLIOT.
LINK BENDING MACHINE.

No. 318,517. Patented May 26, 1885.

WITNESSES
INVENTORS.
James H. Simpson
William G. Gladhill
Carl Gailliot
BY George H. Christy
ATTORNEY.

(No Model.) 5 Sheets—Sheet 3.

J. H. SIMPSON, W. G. GLADHILL & C. GAILLIOT.
LINK BENDING MACHINE.

No. 318,517. Patented May 26, 1885.

WITNESSES:
INVENTORS.

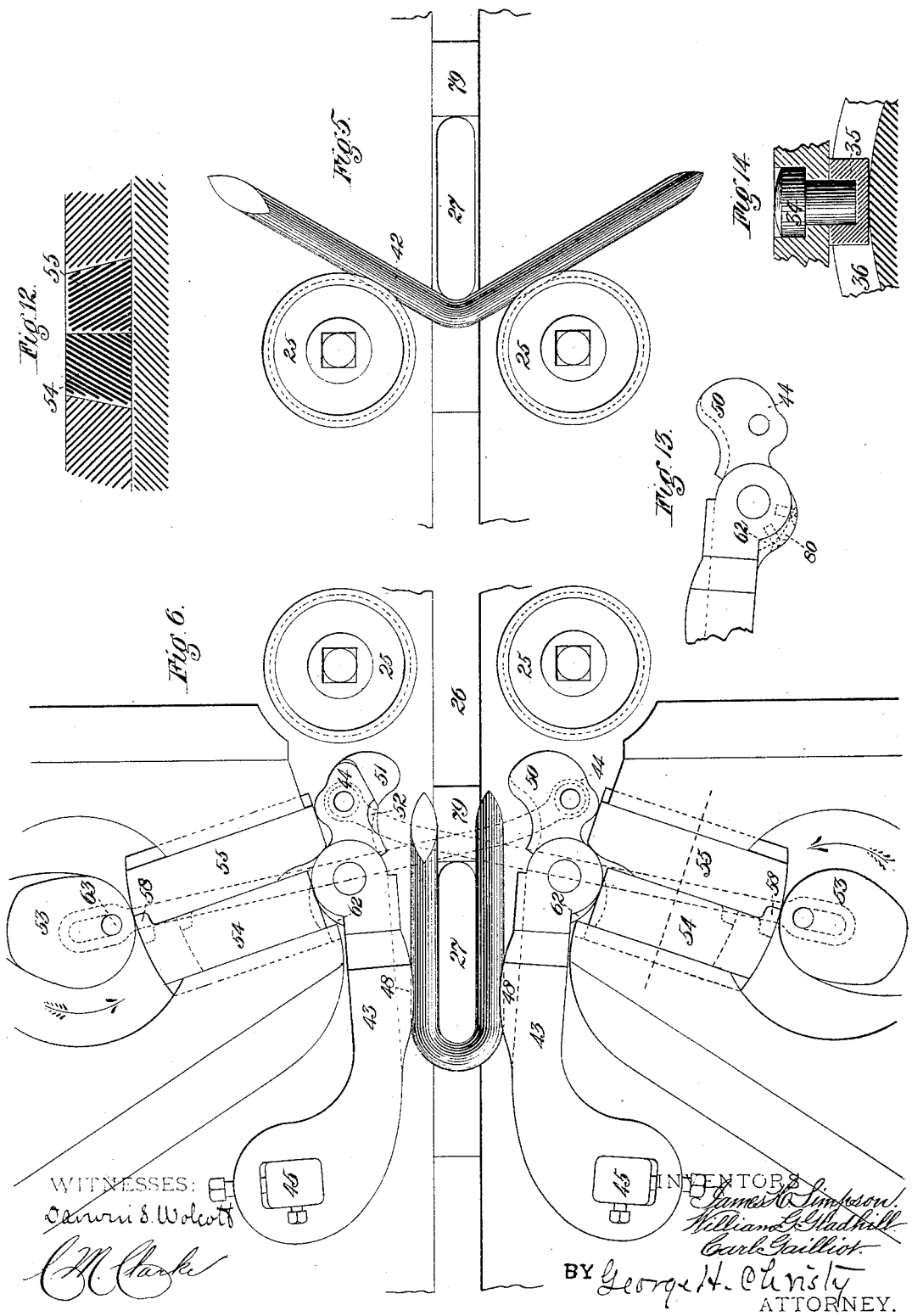

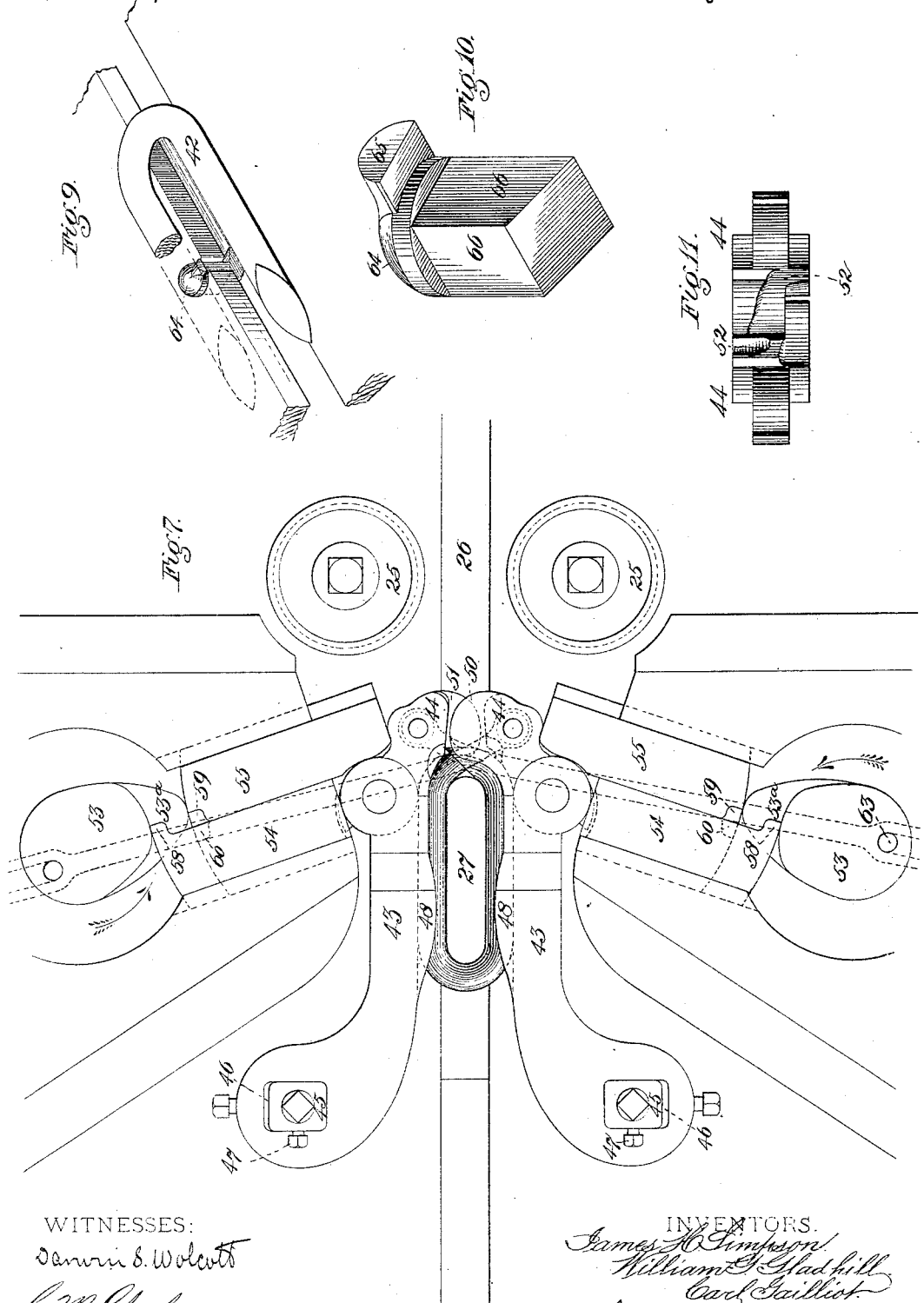

UNITED STATES PATENT OFFICE.

JAMES H. SIMPSON, WILLIAM G. GLADHILL, AND CARL GAILLIOT, OF PITTS-BURG, PENNSYLVANIA, ASSIGNORS TO WILSON, WALKER & CO., (LIMITED,) OF SAME PLACE.

LINK-BENDING MACHINE.

SPECIFICATION forming part of Letters Patent No. 318,517, dated May 26, 1885.

Application filed November 22, 1884. (No model.)

*To all whom it may concern:*

Be it known that we, JAMES H. SIMPSON, a citizen of the United States, WILLIAM G. GLADHILL, a subject of the Queen of Great Britain, and CARL GAILLIOT, a subject of the Emperor of Germany, residing at Pittsburg, in the county of Allegheny and State of Pennsylvania, have invented or discovered certain new and useful Improvements in Link-Bending Machines, of which improvements the following is a specification.

Figure 1:
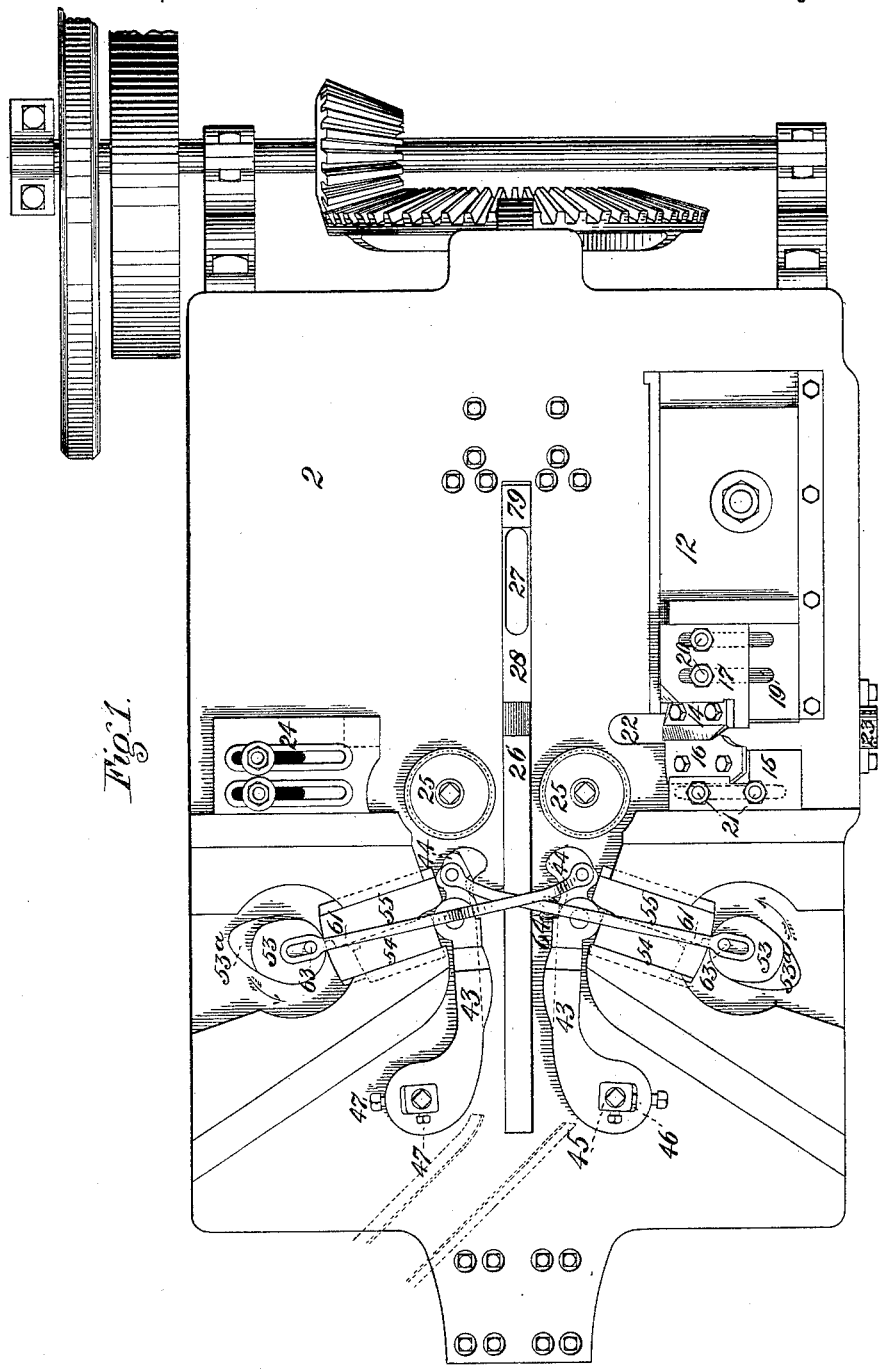
Figure 2:
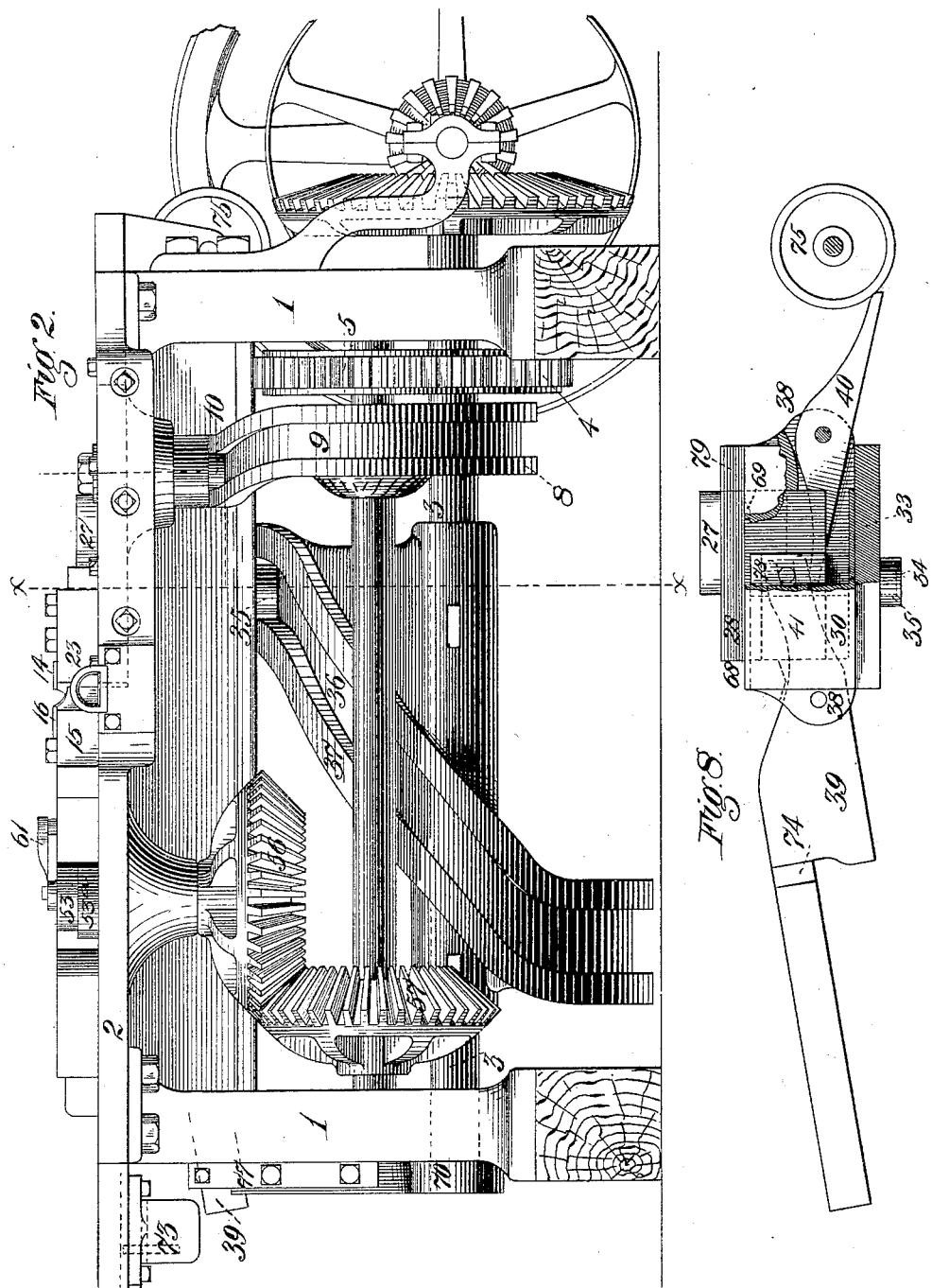
Figure 3:
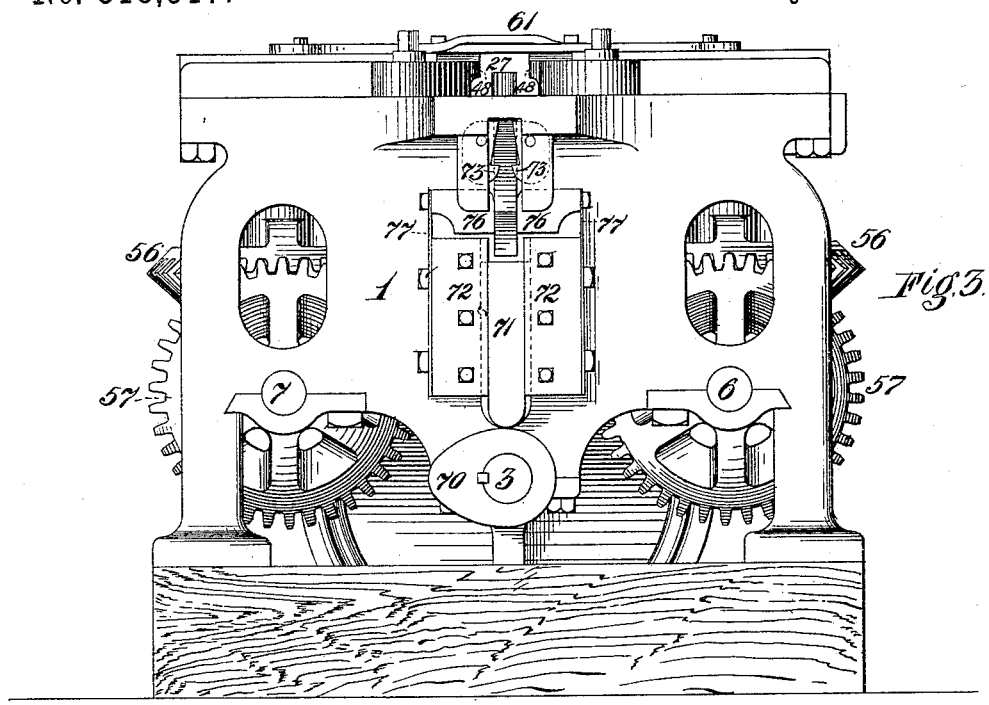
Figure 4:
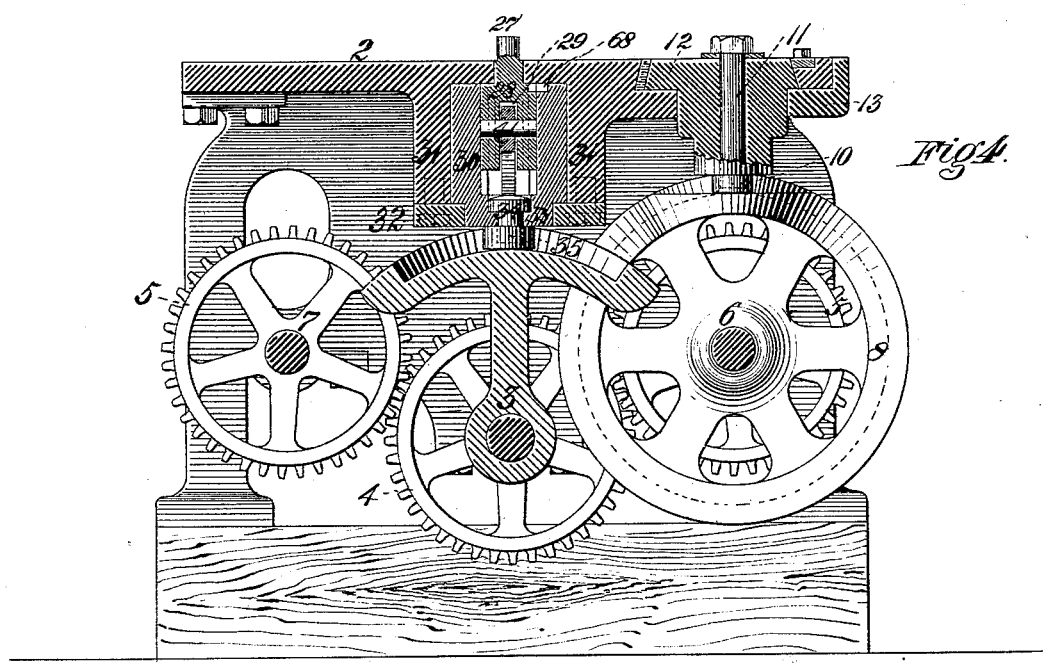

In the accompanying drawings, which make part of this specification, Figure 1 is a top plan view of our improved link-bending machine. Fig. 2 is a side elevation. Fig. 3 is a rear end elevation. Fig. 4 is a transverse sectional elevation, the section being taken on the line $x\,x$, Fig. 2. Figs. 5, 6, and 7 are diagrammatic views illustrative of the operation of bending the link. Fig. 8 is a detail view of the mandrel-carrier and the mandrel-operating levers. Fig. 9 is an enlarged detail view showing the operation of the lifter. Fig. 10 is an enlarged perspective view of the lifter. Fig. 11 is a view of the operative faces of the point-benders. Fig. 12 is a sectional detail view of the sliding bars for operating the compressing-arms and point-benders. Fig. 13 is an enlarged view of the liner employed in adjusting the compressing-arms. Fig. 14 is an enlarged sectional view of the cup-shaped friction-roller.

Our invention relates to that class of machines for cutting and scarfing the ends of blanks, bending such blanks into the form of links, the ends of such blanks, when bent, being caused to overlap one another preparatory to their being welded in dies, or by other suitable means.

The object of our invention is to so construct a machine of the class above described that the various movements of the parts shall occur rapidly and successively—*i. e.*, each part shall have fully effected its function or operation, and have come to a state of rest before the mechanism for effecting the next operation shall commence its movements. By so arranging and timing the operation of the various parts a great saving in the wear of the machine and in the power necessary to operate the same is effected, and as each step is completed before the mechanism for effecting the next starts there is no liability of an interference and consequent distortion of the blank operated on.

In the standards 1, supporting the bed-plate 2, are formed bearings for the main shaft 3, on which is secured the gear-wheel 4, meshing with the gears 5 on the counter-shafts 6 and 7, journaled in the standards 1 on each side of the shaft 3. On the shaft 6 is secured the disk 8, having the cam-groove 9 formed in its periphery, adapted to receive friction-roller 10, mounted on the pin 11, passing through the cutter-carrier 12, said carrier being mounted on ways 13, formed in the bed-plate 2, and projecting down through a slot formed in the bed between said ways, as shown.

To the carrier 12 is secured one of the cutters 14, and to a suitable block, 15, is secured the stationary cutter 16. The cutter 14, however, is not secured directly to the carrier, but is attached to plates 17, the plates 17 and the carrier being provided with slots 19, through which pass the securing-bolts 20, thereby providing for the adjustment of said plate and cutter, the adjustment of the stationary cutter being effected by sliding the bolts 21, passing through the block 15, along a slot formed in the bed-plate, as shown in dotted lines in Fig. 1. The cutters 14 and 16 are secured to the plates 17 and block 15 at an acute angle to the line of feed of the bar to be operated upon, in order that said bar may be cut at the desired angle to its axis for forming the scarf on the ends of the blank, and the plate and block are made adjustable parallel with the line of feed of the bar, in order that the length of the blank may be varied as desired.

Just in the rear of the cutters is formed an opening, 22, through the bed-plate for the discharge of crop ends and scale loosened from the bar in the cutting operation. To the edge of the bed-plate is secured a guide, 23, for the bar as it is fed into the machine.

On the bed-plate, opposite the cutters, is adjustably secured the stop 24, between which and the cutters are arranged the bending-rollers 25, said bending-rollers being loosely mounted on pins projecting up through the bed-plate. These rollers are located equidistant from a longitudinal slot, 26, formed in the bed-plate 2, and up through this slot projects the mandrel 27, around which the links are formed. This mandrel is formed on or secured to a block, 28, having its lower edge slotted, as at 29, and mounted in a reciprocating box or carrier, 30, adapted to fit between flanges 31, depending from the bed-plate 2 on each side of the longitudinal slot 26, and held within said flanges by the plates 32, bolted to the said flanges, as shown in Fig. 4.

Between the plates 32 projects the lug 33, formed on the lower side of the box, and through this lug passes the pin 34, the projecting end of said pin fitting within the friction-roller 35. This friction-roller, constructed in the form of a cup, the lower end being closed for the purpose of retaining oil or any other suitable lubricant, fits within the groove 36 in the circular cam 37, secured to the main shaft 3 of the machine. The groove 36 in this cam is continuous around its periphery, and is so constructed that the carrier is moved rapidly to and fro longitudinal of the machine, but is held for an appreciable length of time at each end, the stop of the rear end being the greater to allow of the operation of other parts of the machine, as will be hereinafter stated.

On the ends of the box or carrier 30 are formed lugs 38, between which are pivoted the levers 39 and 40, the short ends of said levers projecting into the slot in the mandrel-block 28, as shown in Fig. 8, the short end of the lever 39 being forked to engage a pin, 41, passing through the mandrel-block, and the short end of the lever 40 being arranged to bear against the under side of the lever 39, as clearly shown. The outer end of the lever 39 is made of such a length and weight that when unsupported, as is the case when the carrier 28 is at the front of the machine, and during its rearward movement, it will hold the mandrel-block up, in which position of the block the mandrel will project the desired distance above the top of the bed-plate. As the mandrel is moved toward the rear of the machine, it will strike the center of the link-blank 42, previously fed into the machine, as above described, and lying in front of the bending-rollers 25, and as the mandrel passes between said rollers the link-blank will be bent into a U shape, as shown in Fig. 6, closely hugging the mandrel, which, after passing between the rollers 25, moves toward the rear of the machine between the compressing-arms 43 and point-folders 44, as shown in Fig. 6. The compressing-arms 43 are provided at their rear ends with a rectangular opening, 46, adapted to fit over the correspondingly-shaped head of the pins 45, journaled in the bed-plate 2, the opening in the arms being a little longer than the heads of the pins, to allow of the adjustment of the arms toward each other when narrow links are made or smaller bars are to be used, the arms being held in their adjusted positions by the set-screws 47.

Along the upper edge of the operative faces of the compressing-arms are formed the ledges 48, curved on their under side, as shown in Fig. 3, said ledges being adapted to prevent the link from being stripped from the mandrel during the point-bending operation. The under surface on one of the arms is made with a slight upward inclination toward the free end of the arm for the purpose of allowing the leg of the link held by said arm to be slightly raised, as will be more fully stated.

To the free ends of the arms 43 are connected by a rule-joint the point-benders 44. The inner surfaces of these benders are concave, adapting them to fit the curved ends of the completed link, and the points of said benders are cut away on their upper and lower sides, respectively, forming what may be termed "half-points" 50 and 51, to permit of the points passing by each other during the bending operation, and in each bender is formed a curved recess, 52, (see Figs. 6 and 11,) for the reception of the points of the links as they are folded around the mandrel. (See Fig. 7.) The bender having the upper half-point is hinged to the arm 48, having the inclined ledge, as above stated. These compressing-arms 43 and point-benders 44 are actuated by the double cams 53 and 53ª, through the medium of sliding bars 54 and 55, mounted in ways formed in the bed-plate 2, and bearing by one end against the free ends of the arms and a shoulder on the exterior surface of the benders, as shown. These cams are secured to vertical shafts journaled in the bed-plate and a boss depending from the under surface of the bed-plate, and to the lower ends of these shafts are secured the miter-gears 56, which mesh with corresponding gears, 57, on the counter-shafts 6 and 7. The cams 53, rotating in the direction indicated by arrows in several figures, bearing against the rear ends of the bars 54, and a lateral extension, 58, thereof, push forward said bars and the arms 43 in contact therewith, and force said arms against the sides of the partially-formed link surrounding the mandrel, thereby giving the link a "set" and clamping it firmly against said mandrel. As the bars 54 move forward their lateral projections 58 engage corresponding recesses, 59, in the bars 55, thus carrying said bars forward and causing the benders 44 to move in unison with the arms 43 for the full extent of the movement of said arms. At its point of greatest eccentricity the operative face of the cam 53 is so shaped as to hold the bars 54 firmly against the arms 43 during a portion of their rotation. As soon as the cams 53 have rotated sufficiently far to clamp the link against the mandrel the cams 53ª come into operation, one of said cams having passed under one of the bars 54, which is cut away for that purpose, as shown in dotted lines in Figs. 6 and 7, and striking, one against the near end of one of the bars 55 and the other against a lateral projection, 60, at the end of the other bar, (shown in dotted lines in Figs. 6 and 7,) push said bars 55 forward against the benders 44, thereby causing said benders to move forward and wrap the ends of the partially-formed link around the rear end of the mandrel.

In order to retract the arms and benders after the completion of the bending operation, rods 61 are pivotally attached to the benders 44, and, crossing each other, are connected at their opposite ends to pins 63 on the cams 55, said pins being located on that edge of the cam opposite their points of greatest eccentricity, as shown in Figs. 6 and 7; consequently as, in the rotation of the cams, their operative portions leave the bars 54 and 55 the pins are moved toward said bars, and in such movement push, through the instrumentality of the rods 61, the benders 44 away from the link, and during this backward movement of the benders a shoulder, 62, (see Fig. 6,) on the hinge portion of the benders abuts against the arms 43, thereby causing the arms to move back away from the link with the benders. This movement of the arms and benders causes a similar backward movement of the bars 54 and 55, thus keeping said bars in contact with the cams. The outer ends of the bars 61 are slotted, as shown, in order to permit of the independent movement of the pins 63 while the bars are in contact with circular portions of said cams.

In order to allow the ends of the link-blank to lap by each other in the bending operation, it is necessary that one arm or branch of said blank should be raised at its free end above the free end of the opposite branch a distance nearly equal to the diameter of the bar operated on. This movement of one of the branches is effected by the lifter 64, (see Figs. 1, 9, and 10,) said lifter consisting of a circular head having a lateral projection, 65, and the shank 66, adapted to fit in notch 67, formed in one of the walls of the longitudinal slot 26 in the bed-plate, said notch being located nearly opposite the front end of the arms 43. The shank 66 is made of a length sufficient to project below the under surface of the bed-plate, and has its lower end inclined toward the front end of the machine. This shank lies in the path of the reciprocating box or carrier 30, which is provided on the side adjacent to the lifter with a groove, 68, (see Figs. 4 and 8,) in its top edge, said groove terminating in an upward incline, 69, located near that end of the mandrel around which the ends of the link-blank are bent, or at such point along the carrier that just as the carrier reaches the limit of its rearward movement the incline 69 will strike and raise the lifter 64, thereby raising the free end of one branch of the link-blank, the rear portion of said arm being held down by a lateral extension of the ledge 48 on the compressing-arm 43, the rear portion of said branch being carried under the extension, as shown in Fig. 6.

During the rearward movement of the carrier and the subsequent bending operations the long end of the lever 39 hangs free, thus holding the mandrel 27 above the bed-plate. When the carrier has reached the limit of its rearward movement, the long arm of the lever will project a considerable distance through a vertical slot in the rear standard, 1, (see Fig. 3,) and as soon as the bending operations have been completed and the benders and compressing-arms retracted the long end of the lever 39 is raised by the cam 70 on the main shaft, through the medium of the slide-plate 71, mounted in ways 72 on the rear standard, and as this end of the lever is raised the mandrel 27 is drawn down out from the link into the slot 26 by the lowering of the short end of said lever, which is connected with the block carrying the mandrel, as above described. The mandrel is held in this lowered position by means of the hooked dogs 73, pivoted to the rear standard on each side of the upper end of the vertical slot in said standard, said dogs being separated by the inclines 74 on the long arm of the lever as said arm is raised, as before stated, and catching under said arm holds the same in its elevated position until the carrier in its return movement to the front of the machine draws said long arm from between the dogs, when it is free to drop and raise the mandrel. To insure this raising of the mandrel, a roller, 75, is mounted at the front end of the machine, with which the outer end of the lever 40 engages. When the carrier arrives at the forward limit of its movement, said outer end, being depressed by such engagement with the roller 75, causes an upward movement of the short or inner end of the lever 39, resting upon the inner end of the lever 40, as clearly shown in Fig. 8.

In order to lessen the shock and jar caused by the falling of the long and heavy end of the lever 39, blocks 76, having their upper adjacent corners rounded, as shown in Fig. 3, are held in the path of the descending end of the lever 39 by spring 77, which will yield outwardly as the lever 39 strikes said rounded corners and permit of the farther descent of the lever, the springs having such a tension as to impede but not entirely prevent its complete descent.

The sides of mandrel-block 28 are provided with projections 78 adapted to engage and slide vertically in corresponding recesses in the box or carrier 30, thereby preventing any horizontal movement of the block in the carrier. The upper portion of the block is braced as against longitudinal movement when giving the initial bend to the blank by an abutment, 79, formed on the box or carrier at one end thereof. (See Fig. 8.)

When it is desired to form narrow links, the arms 43 are adjusted on the pins 45, as above stated, and a liner, 80, (see Fig. 13,) is attached to that portion of arms 43 against which the bar 54 abuts, the thickness of this liner being in proportion to the amount of adjustment given to the arms 43 on the pins 45. This change in the location of the arms necessitates a corresponding change in the benders 44, which are made in sets of varying sizes, one set being substituted for another according as the arms are adjusted.

It will be observed that the travel of the mandrel from the front to the rear of the machine is very large, and it is necessary, in order to make the machine practically successful, that the movement to and fro should be very rapid. This rapidity of motion is effected by the grooved cam 37, having two sides of the groove arranged at a sharp angle to the axis, and a straight portion at one end for holding the mandrel stationary during the operation of completing the bending of the link.

We claim herein as our invention—

1. In a machine for bending links, a reciprocating mandrel, in combination with a pair of bending-rollers arranged on opposite sides of the path of the mandrel, a pair of compressing-arms similarly arranged, and a pair of independently-oscillating point-benders, substantly as set forth.

2. In a machine for bending links, a reciprocating mandrel, in combination with a pair of movable compressing-arms arranged on opposite sides of the path of the mandrel and a pair of point benders or folders hinged to the compressing-arms, substantially as set forth.

3. In a machine for bending car-links, a mandrel, in combination with a pair of compressing-arms, a pair of point benders or folders, and a lifter adapted to raise one arm of the partially-formed link, substantially as set forth.

4. In a machine for bending car-links, a mandrel, in combination with pivotal arms and pivotal-point benders for closing link-blank around said mandrel, substantially as set forth.

5. In a machine for bending links, a reciprocating mandrel, in combination with a pair of compressing-arms, a pair of independently-oscillating point benders or folders, said arms and folders being arranged on opposite sides of the path of the mandrel, and mechanism for moving said arms and folders toward and from the mandrel, substantially as set forth.

6. In a machine for bending links, a reciprocating box or carrier, in combination with a block carrying a mandrel mounted in said carrier, and a lever pivoted to said carrier and adapted to hold the mandrel in operative position, substantially as set forth.

7. In a machine for bending links, a reciprocating box or carrier, in combination with a mandrel mounted in said carrier, a lever pivoted in the rear end of the carrier and adapted to raise and hold the mandrel in operative position, and a cam operative on the lever for lowering the mandrel, substantially as set forth.

8. In a machine for bending links, a reciprocating box or carrier, in combination with a mandrel vertically movable in the carrier, a lever pivoted in the front end of the carrier and bearing at its inner end against the mandrel, and a roller adapted to bear upon the outer end of the lever for raising the mandrel, substantially as set forth.

9. In a machine for bending links, a reciprocating box or carrier, in combination with a mandrel, a lever pivoted to the carrier and adapted to hold the mandrel in operative position, a cam operative on the lever for lowering the mandrel, and pivoted dogs adapted to catch under the lever, and thereby hold the mandrel in its lowered position, substantially as set forth.

10. In a link-bending machine, a box or carrier, in combination with a mandrel vertically movable in said carrier, and a lever, 39, pivoted to the carrier and adapted to raise and lower the mandrel, substantially as set forth.

11. In a link-bending machine, a mandrel, in combination with a pair of compressing and clamping arms, and a pair of independently-moving point-benders, and mechanism for causing said arms and benders to act in succession on the link-blank, substantially as set forth.

12. In a link-bending machine, a mandrel, in combination with pivoted compressing-arms 43, point-benders 44, interlocked slide-bars 54 and 55, arranged to bear at one end against said arms, and benders and cams 53 and 53ª, arranged to operate on the outer ends of said bars, substantially as set forth.

13. In a link-bending machine, a mandrel, in combination with a pair of compressing and clamping arms, a pair of point-benders pivoted to said arms, cams for forcing said arms and benders around the mandrel, and rods connected to the benders and to the cams operative on the opposite arms and benders for forcing said arms and benders away from the mandrel, substantially as set forth.

14. In a link-bending machine, a mandrel, in combination with a pair of clamping-arms, 43, a pair of point-benders, 44, pivoted to the arms, interlocked slide-bars 54 and 55, cams 53 and 53ª, and rods 61, so arranged as to connect the bender on one side of the mandrel with the cam on the opposite side thereof, substantially as set forth.

15. In a link-bending machine, a reciprocating mandrel, in combination with a pair of compressing-arms and point-benders, and a cam for moving said mandrel in between said arms and benders and holding it in such position during the completion of the bending operation, substantially as set forth.

16. In a link-bending machine, the combination of a reciprocating mandrel provided with a journal-pin, a cup-shaped friction-roller mounted on said pin, and a cam provided with a groove for the reception of the friction-roller, substantially as set forth.

In testimony whereof we have hereunto set our hands.

JAMES H. SIMPSON.
WILLIAM G. GLADHILL.
CARL GAILLIOT.

Witnesses:
R. H. WHITTLESEY,
DARWIN S. WOLCOTT.